United States Patent
Noguchi et al.

(10) Patent No.: US 9,085,191 B2
(45) Date of Patent: Jul. 21, 2015

(54) BACKGROUND PATTERN IMAGE COMBINING APPARATUS, BACKGROUND PATTERN IMAGE COMBINING METHOD, AND COMPUTER-READABLE STORAGE MEDIUM FOR COMPUTER PROGRAM

(75) Inventors: Kazuyoshi Noguchi, Toyohashi (JP); Kazuhiro Ishiguro, Toyohashi (JP); Takayuki Nabeshima, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 1019 days.

(21) Appl. No.: 13/149,443

(22) Filed: May 31, 2011

(65) Prior Publication Data

US 2011/0299794 A1    Dec. 8, 2011

(30) Foreign Application Priority Data

Jun. 3, 2010 (JP) ................. 2010-128183

(51) Int. Cl.
*G06K 9/36* (2006.01)
*B41M 3/14* (2006.01)
*H04N 1/00* (2006.01)
*H04N 1/32* (2006.01)

(52) U.S. Cl.
CPC .......... *B41M 3/146* (2013.01); *H04N 1/00846* (2013.01); *H04N 1/00867* (2013.01); *H04N 1/00883* (2013.01); *H04N 1/32203* (2013.01); *H04N 1/32229* (2013.01); *H04N 2201/327* (2013.01); *H04N 2201/3269* (2013.01); *H04N 2201/3271* (2013.01)

(58) Field of Classification Search
None
See application file for complete search history.

(56) References Cited

U.S. PATENT DOCUMENTS

| | | | |
|---|---|---|---|
| 4,341,404 A | 7/1982 | Mowry, Jr. et al. | |
| 5,149,140 A | 9/1992 | Mowry, Jr. et al. | |
| 7,599,099 B2 | 10/2009 | Tamaru | |
| 8,023,127 B2 * | 9/2011 | Matsunoshita | 358/1.14 |
| 8,055,180 B2 * | 11/2011 | Murakami | 399/366 |

(Continued)

FOREIGN PATENT DOCUMENTS

| | | |
|---|---|---|
| EP | 0 806 706 | 11/1997 |
| EP | 1 906 644 | 4/2008 |

(Continued)

OTHER PUBLICATIONS

European Communication mailed Jul. 20, 2011, directed to European Application No. 11167637.5; 5 pages.

(Continued)

*Primary Examiner* — Jayesh A Patel
(74) *Attorney, Agent, or Firm* — Buchanan Ingersoll & Rooney PC (57) ABSTRACT

A background pattern image combining apparatus for combining a background pattern image with an input image is provided. The background pattern image includes a plurality of first isolated points having a size that can be read by an image reader and a plurality of second isolated points having a size that cannot be read by the image reader. The background pattern image combining apparatus includes a detector that detects, in the input image, a specific area which is an area having a specific state, and a combining portion that combines the background pattern image with the input image by placing not the plurality of first isolated points but the plurality of second isolated points in the specific area, and, by placing the plurality of first isolated points and the plurality of second isolated points in an area other than the specific area.

21 Claims, 12 Drawing Sheets

(56) References Cited

U.S. PATENT DOCUMENTS

| | | | |
|---|---|---|---|
| 8,411,296 B2* | 4/2013 | Ono | 358/1.14 |
| 8,593,698 B2* | 11/2013 | Simske et al. | 358/3.28 |
| 2003/0179412 A1* | 9/2003 | Matsunoshita | 358/3.28 |
| 2003/0210419 A1* | 11/2003 | Reese et al. | 358/1.14 |
| 2004/0114190 A1* | 6/2004 | Man | 358/3.28 |
| 2004/0150859 A1 | 8/2004 | Hayashi | |
| 2005/0052682 A1 | 3/2005 | Ishikawa et al. | |
| 2005/0141015 A1* | 6/2005 | Fusayuki | 358/1.14 |
| 2006/0274939 A1* | 12/2006 | Yamada | 382/173 |
| 2007/0109585 A1 | 5/2007 | Tanaka et al. | |
| 2008/0101651 A1* | 5/2008 | Matsunoshita | 382/100 |
| 2008/0166013 A1 | 7/2008 | Ishikawa et al. | |
| 2009/0027702 A1* | 1/2009 | Sakai | 358/1.9 |
| 2009/0190182 A1 | 7/2009 | Ishikawa et al. | |
| 2010/0150433 A1* | 6/2010 | Wang et al. | 382/162 |
| 2010/0157378 A1* | 6/2010 | Cole et al. | 358/3.28 |

FOREIGN PATENT DOCUMENTS

| | | |
|---|---|---|
| JP | 8-180047 | 7/1996 |
| JP | 2006-333140 | 12/2006 |
| JP | 2008-172758 | 7/2008 |
| JP | 2009-182512 | 8/2009 |
| WO | WO-97/32735 | 9/1997 |

OTHER PUBLICATIONS

Notification of Reasons for Refusal mailed May 1, 2012, directed to Japanese Application No. 2010-128183; 8 pages.

Office Action dated Sep. 4, 2013, directed to Chinese Patent Application No. 201110148685.0; 8 pages.

European Official Communication dated Jan. 28, 2015 for corresponding European Patent Application No. 11167637.5.

* cited by examiner

BACKGROUND PATTERN IMAGE COMBINING APPARATUS, BACKGROUND PATTERN IMAGE COMBINING METHOD, AND COMPUTER-READABLE STORAGE MEDIUM FOR COMPUTER PROGRAM

This application is based on Japanese patent application No. 2010-128183 filed on Jun. 3, 2010, the contents of which are hereby incorporated by reference.

BACKGROUND OF THE INVENTION

1. Field of the Invention

The present invention relates to an apparatus and method for integrating a background pattern image into an input image.

2. Description of the Related Art

In order to deter unauthorized copying of a document image depicted on the original paper, a technique has been employed in which a character string such as "copy" is printed onto paper as a background pattern image together with the document image.

Figure 5:
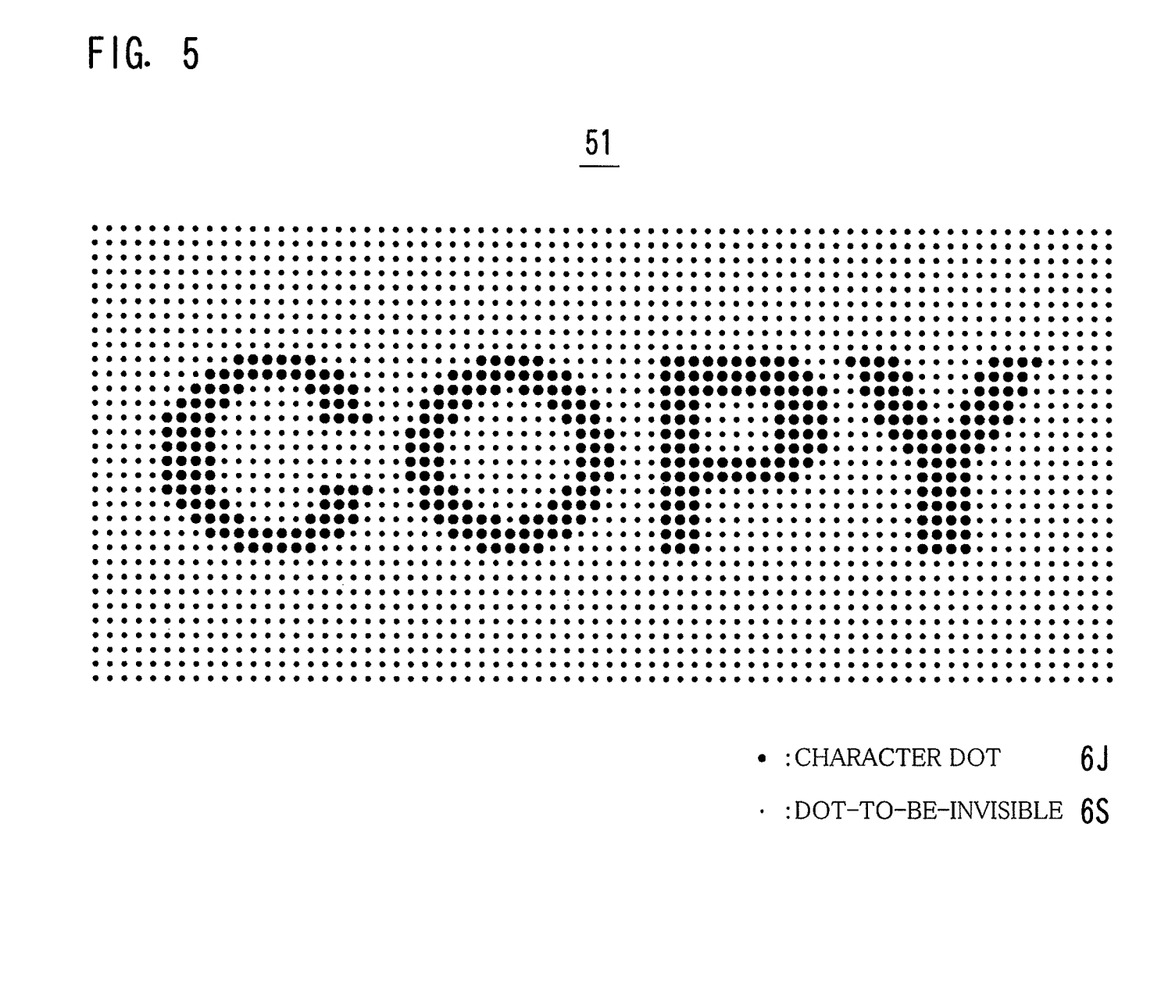
FIG. 5 is a diagram illustrating an example of a background pattern image.

Such a "background pattern image" consists of many character dots 6J and dots-to-be-invisible 6S as shown in FIG. 5. The character dots 6J represent a character string, and the dots-to-be-invisible 6S camouflage (disguise) the character string.

Each of the character dots 6J and the dots-to-be-invisible 6S is very small. While the character dot 6J has a size that can be scanned by a scanner, the dot-to-be-invisible 6S has a size that cannot be scanned thereby. Accordingly, if a copier is used to copy the document image depicted on the original paper, only the character dots 6J are printed on paper with the dots-to-be-invisible 6S not printed thereon. This makes the character string represented by the background pattern image apparent. It is, thus, possible to deter someone from making unauthorized copying.

Overlaying a background pattern image on a document image sometimes renders the document itself illegible. To cope with this, there has been proposed the following method.

In combining character data and modification data that are stored separately from each other, and outputting the resultant data, a CPU determines whether or not the character data or the modification data is present. Note that background pattern image data is used as the modification data. When both the character data and the modification data to be outputted are present, a further determination is made as to whether or not the modification data exceeds a prescribed density. Then, when it is determined that the modification data exceeds the prescribed density, trimming is performed in which a portion corresponding to one dot adjacent to a character dot of the character data is turned OFF, and then, the character data is combined with the modification data and the resultant data is outputted (Japanese Laid-open Patent Publication No. 8-180047).

Figure 10A:
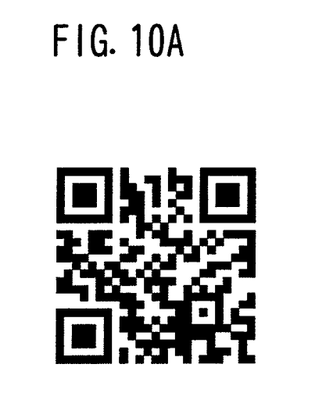
FIGS. 10A to 10C are diagrams illustrating an example of a QR code.
Figure 10B:
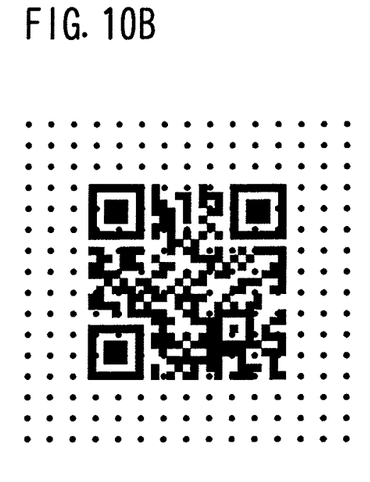
Figure 10C:
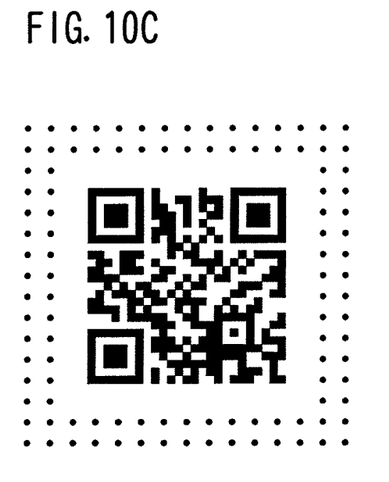

FIGS. 10A to 10C are diagrams showing an example of a Quick Response (QR) code.

According to the method described in Japanese Laid-open Patent Publication No. 8-180047, characters are reversed, and therefore, a background pattern image is less camouflaged.

Further, the method described in Japanese Laid-open Patent Publication No. 8-180047 is not applicable to an object other than characters, for example, not applicable to a QR code as shown in FIG. 10A. This is because if dots constituting the QR code are reversed, it becomes impossible for a computer to analyze the QR code.

As shown in FIG. 10B, simply overlaying a background pattern image on the QR code again makes it difficult for a computer to analyze the QR code. To cope with this, it may be conceived that a background pattern image is disposed so as not to overlap with the QR code and its periphery as shown in FIG. 10C. This, however, makes the QR code stand out for the entire document.

SUMMARY

The present disclosure is directed to solve the problems pointed out above, and therefore, an object of an embodiment of the present invention is to combine a background pattern image with an input image more favorably than that in the conventional case.

A background pattern image combining apparatus according to an aspect of the present invention is a background pattern image combining apparatus for combining a background pattern image with an input image, the background pattern image including a plurality of first isolated points having a size that can be read by an image reader and a plurality of second isolated points having a size that cannot be read by the image reader. The background pattern image combining apparatus includes a detector that detects, in the input image, a specific area which is an area having a specific state, and a combining portion that combines the background pattern image with the input image by placing not the plurality of first isolated points but the plurality of second isolated points in the specific area, and, by placing the plurality of first isolated points and the plurality of second isolated points in an area other than the specific area.

Preferably, the combining portion places the plurality of first isolated points and the plurality of second isolated points in the thin line area and an adjacent area next to the thin line area in such a manner that with respect to one line, out of the two lines, sandwiched between the thin line area and the adjacent area, a distance between that one line and one of the plurality of first isolated points closest to that one line is equal to a distance between that one line and one of the plurality of second isolated points closest to that one line.

Preferably, the combining portion does not place any of the plurality of first isolated points and any of the plurality of second isolated points next to a pixel representing a black dot in the input image.

Figure 6:
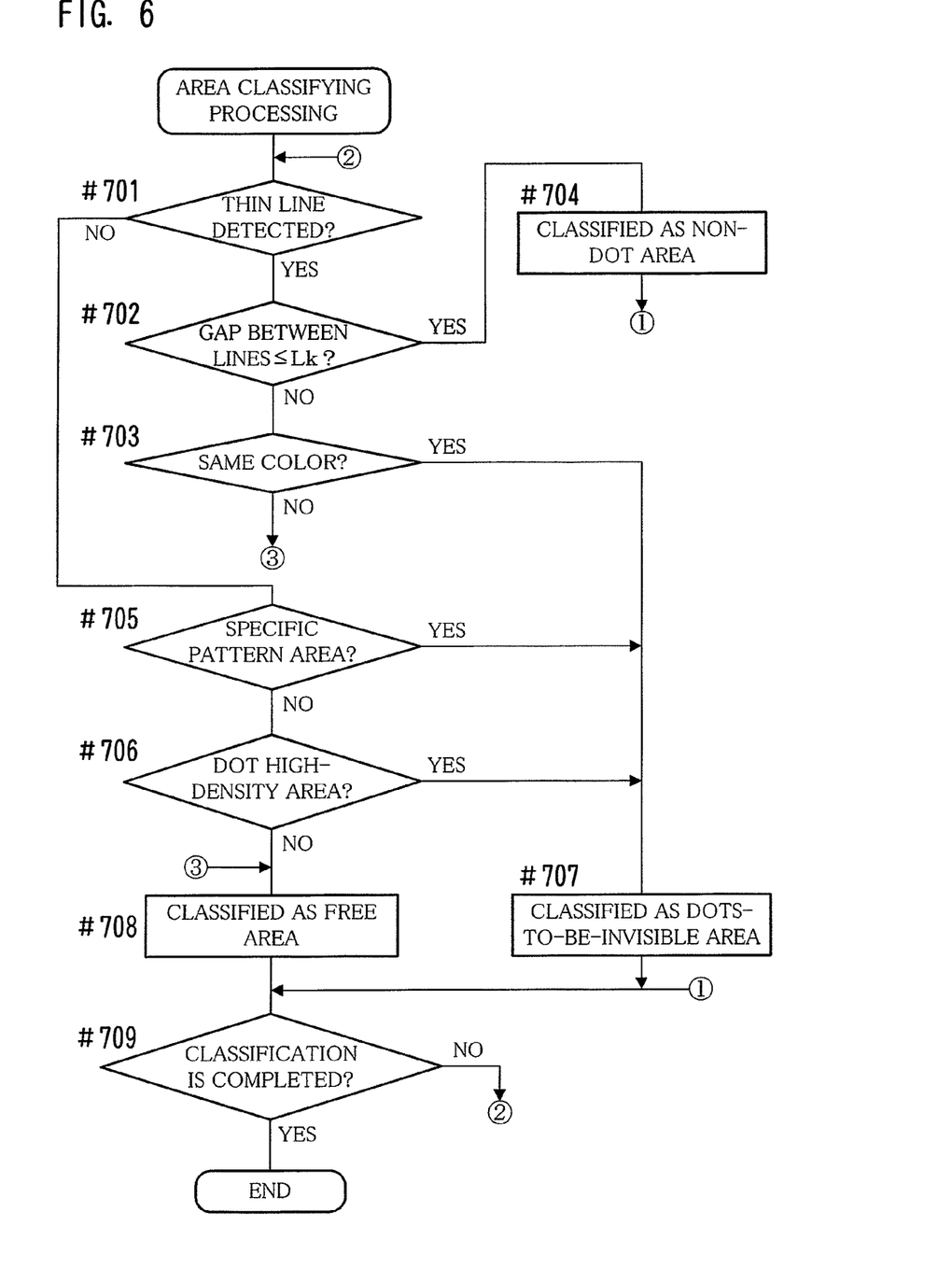
FIG. 6 is a flowchart depicting an example of the flow of area classifying processing.

Preferably, the detector determines whether or not the two lines have a same color as that of the plurality of first isolated points, and, if the detector determines that the two lines have, then the detector detects an area defined by the two lines as the thin line classified as a dots-to-be-invisible area in Step #703 of FIG. 6.

These and other characteristics and objects of the present invention will become more apparent by the following descriptions of preferred embodiments with reference to drawings.

DESCRIPTION OF THE PREFERRED EMBODIMENTS

Figure 1:
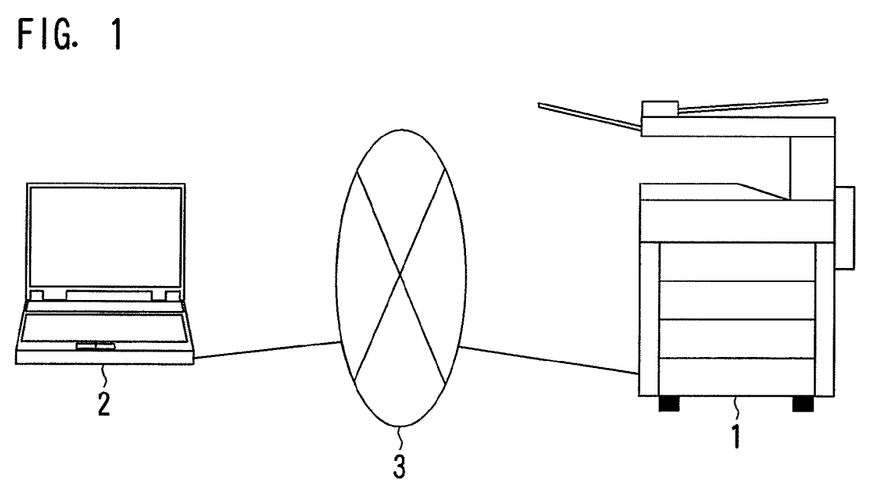
FIG. 1 is a diagram illustrating an example of a network system including an image forming apparatus.
Figure 2:
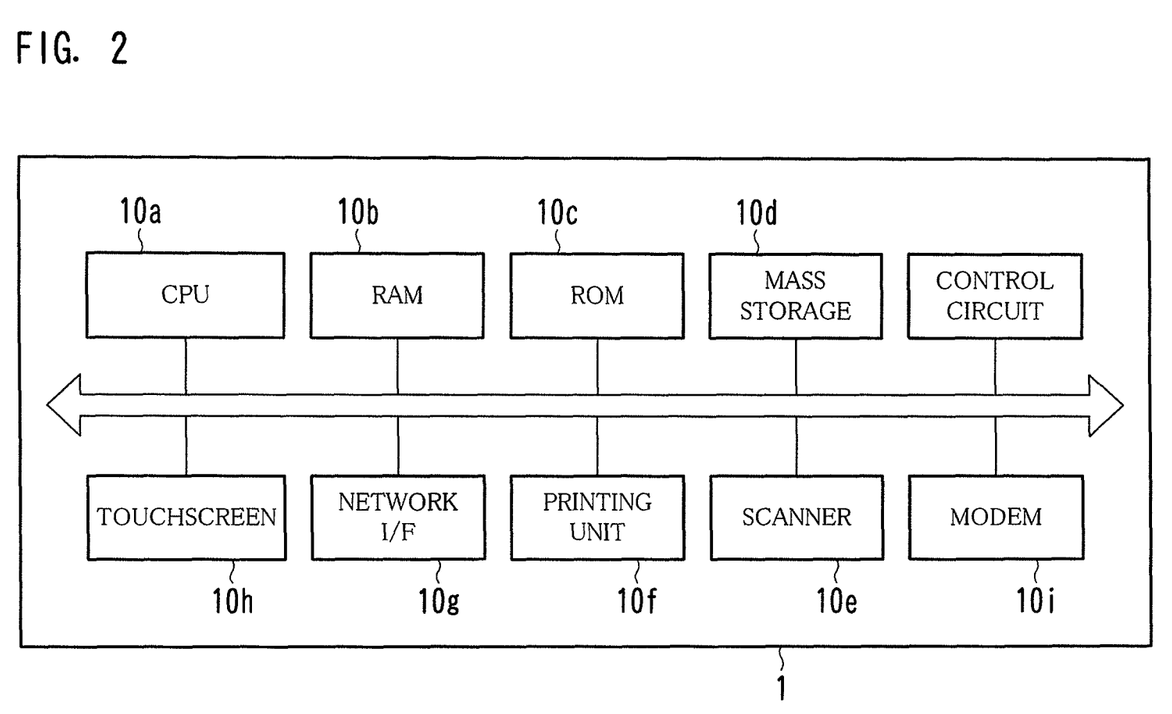
FIG. 2 is a diagram illustrating an example of the hardware configuration of an image forming apparatus.
Figure 3:
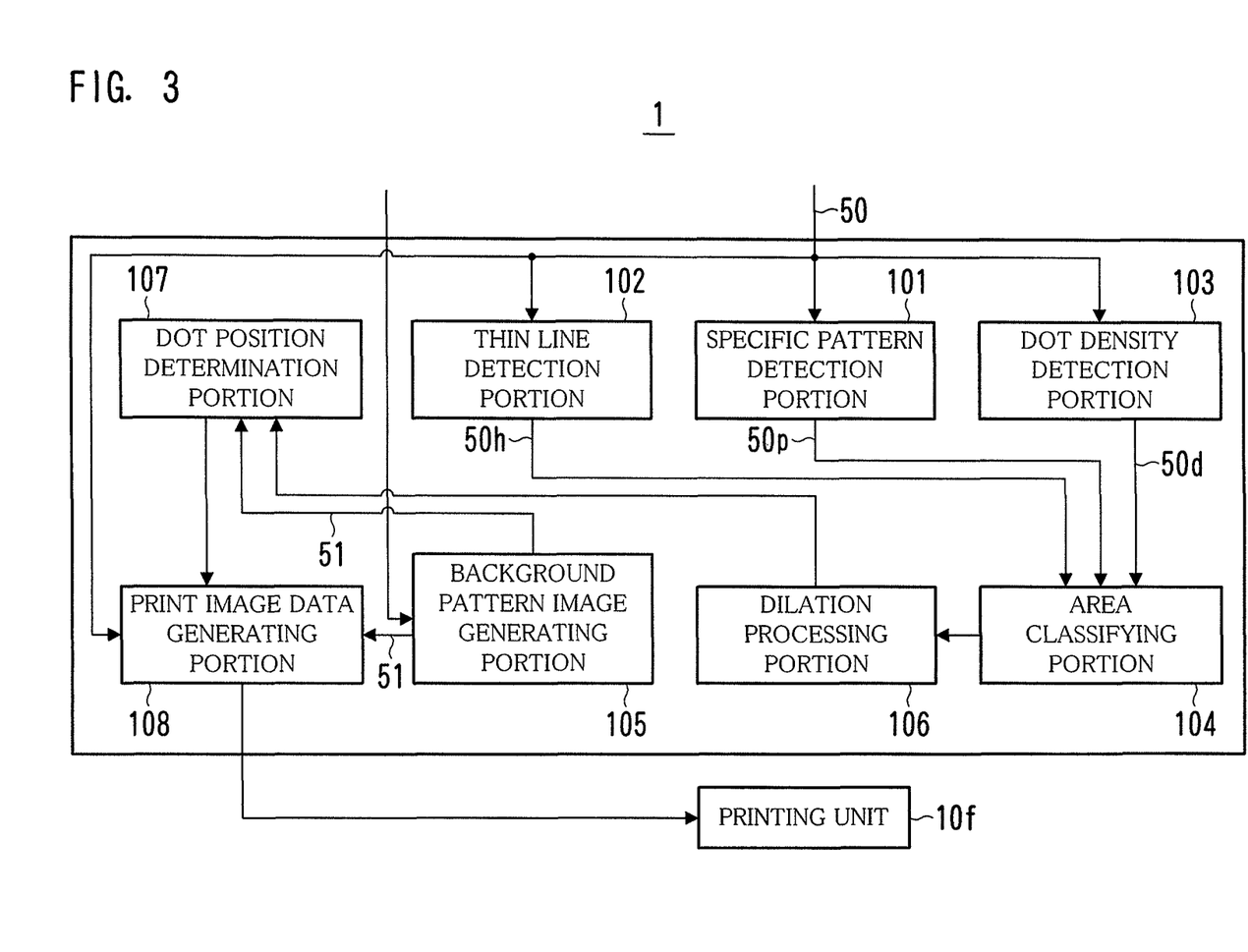
FIG. 3 is a diagram illustrating an example of the functional configuration of an image forming apparatus.

FIG. 1 is a diagram illustrating an example of a network system including an image forming apparatus 1; FIG. 2 is a diagram illustrating an example of the hardware configuration of the image forming apparatus 1; and FIG. 3 is a diagram illustrating an example of the functional configuration of the image forming apparatus 1.

The image forming apparatus 1 shown in FIG. 1 is an apparatus generally called a multifunction device, a Multi-Function Peripheral (MFP), or the like. The image forming apparatus 1 is configured to integrate, thereinto, a variety of functions, such as copying, network printing (PC printing), faxing, and scanning.

The image forming apparatus 1 is capable of sending and receiving image data with a device such as a personal computer 2 via a communication line 3, e.g., a Local Area Network (LAN), a public line, or the Internet.

Referring to FIG. 2, the image forming apparatus 1 is configured of a Central Processing Unit (CPU) 10a, a Random Access Memory (RAM) 10b, a Read-Only Memory (ROM) 10c, a mass storage 10d, a scanner 10e, a printing unit 10f, a network interface 10g, a touchscreen 10h, a modem 10i, a control circuit, and so on.

The network interface 10g is a Network Interface Card (NIC) for communicating with another device such as the personal computer 2 via the communication line 3.

The touchscreen 10h displays, for example, a screen for giving a message or instructions to a user, a screen for the user to enter a process command and process conditions, and a screen for displaying the result of a process performed by the CPU 10a. The touchscreen 10h also detects a position thereof touched by the user with his/her finger, and sends a signal indicating the result of the detection to the CPU 10a.

The scanner 10e is a device that reads images printed on paper, such as photographs, characters, drawings, diagrams, and the like, and creates image data thereof.

The modem 10i is a device for transmitting image data via a fixed-line telephone network to another facsimile terminal and vice versa based on a protocol such as Group 3 (G3).

The printing unit 10f serves to print, onto paper, an image obtained by scanning with the scanner 10e or an image indicated in image data received from the personal computer 2 or another facsimile terminal. Such an image is hereinafter referred to as a "document image 50".

The image forming apparatus 1 is also equipped with a background pattern image print function to print, onto paper, a background pattern image together with the document image 50.

The ROM 10c and the mass storage 10d store, therein, programs and data for implementing the functions of a specific pattern detection portion 101, a thin line detection portion 102, a dot density detection portion 103, an area classifying portion 104, a background pattern image generating portion 105, a dilation processing portion 106, a dot position determination portion 107, a print image data generating portion 108, and the like, all of which are shown in FIG. 3. These programs and data are loaded into the RAM 10b as necessary, and executed by the CPU 10a. The individual portions shown in FIG. 3 perform processing; thereby to implement the background pattern image print function.

An example of the mass storage 10d is a hard disk or a flash memory.

The personal computer 2 is a client to which the image forming apparatus 1 provides service. A driver for the image forming apparatus 1 is installed into the personal computer 2.

Figure 4:
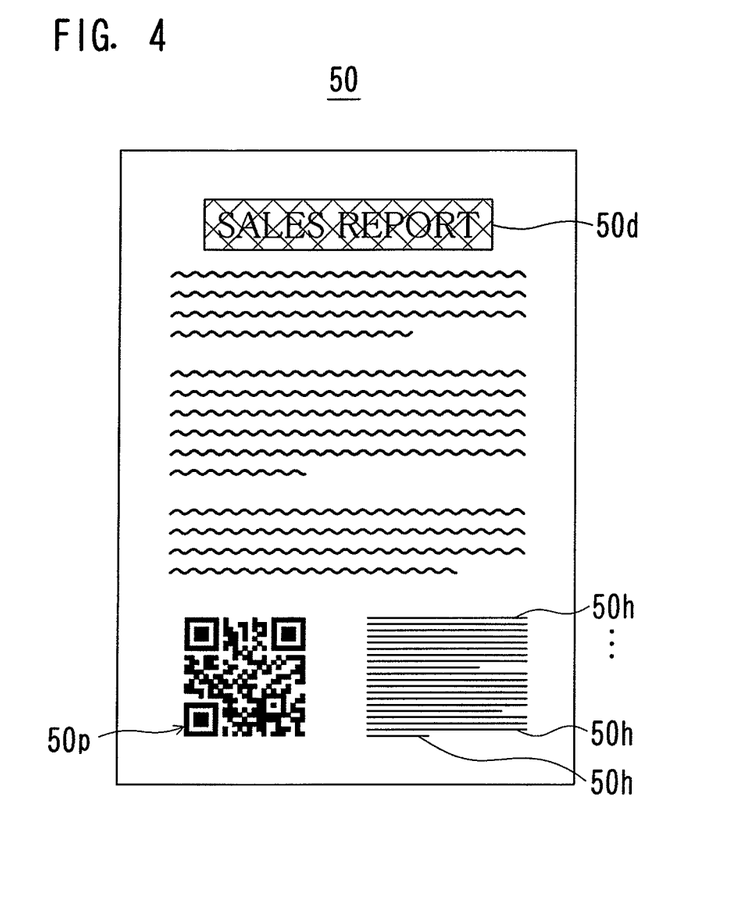
FIG. 4 is a diagram illustrating an example of a document image.
Figure 7:
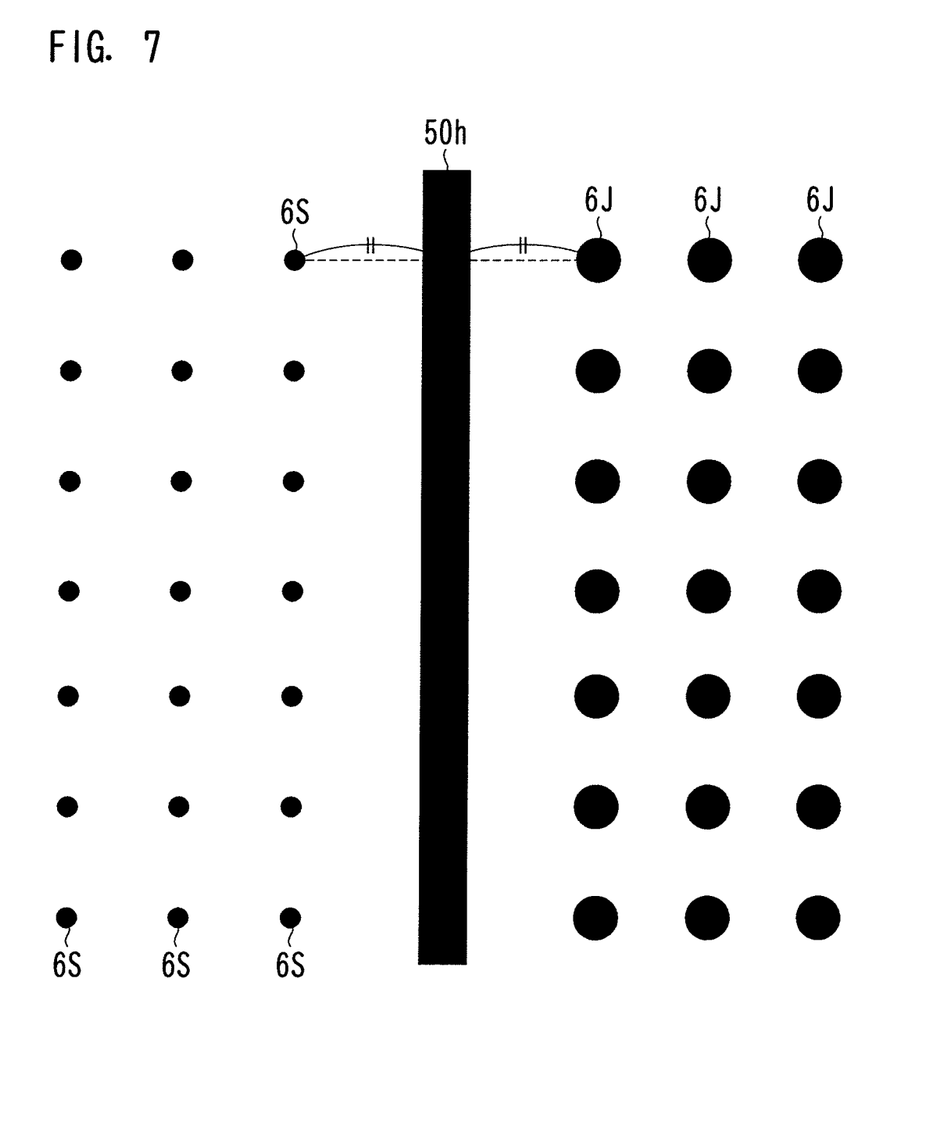
FIG. 7 is a diagram illustrating an example of the positional relationship among a thin line, character dots, and dots-to-be-invisible.

FIG. 4 is a diagram illustrating an example of a document image 50; FIG. 5 is a diagram illustrating an example of a background pattern image 51; FIG. 6 is a flowchart depicting an example of the flow of area classifying processing; and FIG. 7 is a diagram illustrating an example of the positional relationship among a thin line 50h, character dots 6J, and dots-to-be-invisible 6S.

The following is a description of user operation and processes performed by the individual portions of the image forming apparatus 1 shown in FIG. 3 for a case where a document image 50 is printed onto paper together with a background pattern image.

The user prepares a document image 50 to be printed along with a background pattern image. For example, the user may create the document image 50 by using an application such as word-processing software or drawing software for the personal computer 2. Alternatively, the user may use, as the document image 50, a handwritten image on paper. The following is a description of an example in which the user creates the document image 50 shown in FIG. 4 by using drawing software for the personal computer 2.

After creating the document image 50 by using the drawing software, the user operates the personal computer 2 to enter a print command thereinto. At this time, the user selects an option to add a background pattern image to an input image.

In response to this operation, the personal computer 2 transmits image data of the document image 50 and a predetermined command to the image forming apparatus 1.

When the image forming apparatus 1 receives the image data and the predetermine command, the specific pattern detection portion 101 through the print image data generating portion 108 discussed above perform the following processes.

The specific pattern detection portion 101 detects, in the document image 50, a specific pattern area 50p that is an area having a specific pattern. The specific pattern detection portion 101 detects, as the specific pattern area 50p, for example, an area containing a one-dimensional bar code or an area containing a Quick Response (QR) code.

The "one-dimensional bar code" is a series of stripes, or, in other words, is constituted by bars and spaces having proportional thickness and thinness. The "one-dimensional bar code" is sometimes called a "bar code" simply. The "QR code" is a matrix code consisting of black modules arranged in a square pattern on a white background, as is shown in the lower-left of the document image 50 of FIG. 4. The specific pattern detection portion 101, thus, detects the QR code in the document image 50 as the specific pattern area 50p.

The thin line detection portion 102 detects, in the document image 50, a thin line 50h having a width equal to or less than a threshold Lw (3 dots, for example). At this time, the thin line detection portion 102 also detects a width of each of the thin lines 50h.

The dot density detection portion 103 detects, as a dot high-density area 50d, an area in which the total number of pixels of the area is a constant value or more, and the ratio of the number of dotted pixels to the total number of pixels is a predetermined value or more.

Meanwhile, as shown in FIG. 5, a background pattern image is constituted by many small dots having two different sizes. The many small dots are arranged not to contact each other, or, in other words, are isolated from each other. In short, the dots are isolated points.

A scanner can scan larger dots. A group of the larger dots represent a character string. The larger dots are hereinafter referred to as "character dots 6J".

On the other hand, a scanner cannot scan smaller dots. Even if paper on which the smaller dots are printed is scanned by the scanner, the smaller dots are not read thereby. The smaller dots, therefore, seem to disappear from a printed matter. In view of this, the smaller dots are hereinafter referred to as "dots-to-be-invisible 6S". The dots-to-be-invisible 6S are used to camouflage a character string represented by the character dots 6J.

Referring now back to FIG. 3, the area classifying portion 104 categorizes the entire area of the document image 50 into a free area, a dots-to-be-invisible area, and a non-dot area. The "free area" is a section in which both the character dots 6J and the dots-to-be-invisible 6S can be placed. The "dots-to-be-invisible area" is a section in which only the dots-to-be-invisible 6S can be placed. The "non-dot area" is a section in which neither the character dots 6J nor the dots-to-be-invisible 6S can be placed.

A categorization process by the area classifying portion 104 is described below with reference to the flowchart of FIG. 6.

If the thin line detection portion 102 detects thin lines 50h (Yes in Step #701 of FIG. 6), and, if a gap between two neighboring thin lines 50h is a threshold Lk, e.g., a length corresponding to 5 dots, or smaller (Yes in Step #702), then the area classifying portion 104 classifies (determines) a section between the two neighboring thin lines 50h as a non-dot area (Step #704). The section between the two neighboring thin lines 50h is hereinafter referred to as a "thin line area".

On the other hand, if the gap (section) between two neighboring thin lines 50h is greater than the threshold Lk (No in Step #702), and, if the color of character dots 6J is identical to the color of the two neighboring thin lines 50h (Yes in Step #703), then the area classifying portion 104 determines that the thin line area is a dots-to-be-invisible area (Step #707). Otherwise (No in Step #703), the area classifying portion 104 determines that the thin line area is a free area (Step #708).

If the specific pattern detection portion 101 detects a specific pattern area 50p (Yes in Step #705), then the area classifying portion 104 classifies the specific pattern area 50p as a dots-to-be-invisible area (Step #707).

If the dot density detection portion 103 detects a dot high-density area 50d (Yes in Step #706), then the area classifying portion 104 classifies the dot high-density area 50d as a dots-to-be-invisible area (Step #707).

Subsequently, the area classifying portion 104 determines (Step #708), as a free area, an area that is categorized as neither a dots-to-be-invisible area nor a non-dot area through the foregoing steps.

Referring now back to FIG. 3, the background pattern image generating portion 105 generates a background pattern image 51 in accordance with a command from the personal computer 2. In this embodiment, the background pattern image generating portion 105 generates a background pattern image 51 representing a character string of "COPY" as shown in FIG. 5. Note, however, that the positions of the character dots 6J and dots-to-be-invisible 6S are properly adjusted by the dot position determination portion 107 as is discussed later.

The dilation processing portion 106 dilates areas determined to be either dots-to-be-invisible areas or non-dot areas by dilation processing thereon, so that two areas adjacent to each other are allowed to contact each other.

The dot position determination portion 107 determines where the character dots 6J and the dots-to-be-invisible 6S, which constitute the background pattern image 51 generated by the background pattern image generating portion 105, are to be positioned in the areas that have undergone the dilation processing appropriately by the dilation processing portion 106. The determination is made in a manner based on the following method [1] and method [2].

Method [1]: The character dots 6J are placed at regular intervals Lj in an area of the document image 50 classified as a free area in such a manner that a character string "COPY" is represented. For example, the character dots 6J are so placed that the character string is represented in the middle of the free area. If the free area is substantially large, the character dots 6J may be so placed that a plurality of character strings "COPY" are represented side-by-side. In this embodiment, a gap between the dots (the character dots 6J or the dots-to-be-invisible 6S) is denoted by using the number of dots defining a distance between the centers of the dots.

Method [2]: The dots-to-be-invisible 6S are placed at regular intervals Ls in an area classified as a free area, to be more specific, in a part of the free area where the character dots 6J are not placed, in such a manner that the dots-to-be-invisible 6S do not contact the character dots 6J. Further, the dots-to-be-invisible 6S are placed at regular intervals Ls in an area classified as a dots-to-be-invisible area. The interval Ls may be equal to the interval Lj. It is desirable that the interval Ls between the dots-to-be-invisible 6S be kept also around the boundary between two neighboring areas.

Further, the dot position determination portion 107 adjusts the positions of the character dots 6J and dots-to-be-invisible 6S so that both rule [3] and rule [4] discussed below are satisfied.

Rule [3]: The dots-to-be-invisible 6S are placed so as to avoid being adjacent to black pixels. Alternatively, the dots-to-be-invisible 6S are placed so as to avoid being adjacent to other pixels having the same color as that of the dots-to-be-invisible 6S.

Rule (4): In the case where the character dots 6J and the dots-to-be-invisible 6S are placed with a thin line 50h interposed therebetween, the dot position determination portion 107 places the character dots 6J and the dots-to-be-invisible 6S in such a manner that a distance between the thin line 50h and the character dot 6J or the dot-to-be-invisible 6S that is placed on one side with respect to the thin line 50h and is closest thereto is the same as a distance between the thin line 50h and the character dot 6J or the dot-to-be-invisible 6S that is placed on the other side with respect to the thin line 50h and is closest thereto. Suppose, for example, that the thin line 50h is a line extending along the up-down direction, and, that the dots-to-be-invisible 6S and the character dots 6J are to be placed on the left and the right of the thin line 50h respectively. In such a case, as shown in FIG. 7, the dot position determination portion 107 determines the positions of the character dots 6J and dots-to-be-invisible 6S in such a manner that a distance between the thin line 50h and the dot-to-be-invisible 6S that is placed on the left of the thin line 50h and is closest thereto is the same as a distance between the thin line 50h and the character dot 6J that is placed on the right of the thin line 50h and is closest thereto.

The print image data generating portion 108 disposes the character dots 6J and the dots-to-be-invisible 6S at the positions on the document image 50 determined by the dot position determination portion 107; thereby to combine the document image 50 and the background pattern image 51 together. As a result, image data for printing is generated.

The printing unit 10f prints, onto paper, the document image 50 with which the background pattern image 51 is combined based on the image data generated by the print image data generating portion 108.

Figure 8:
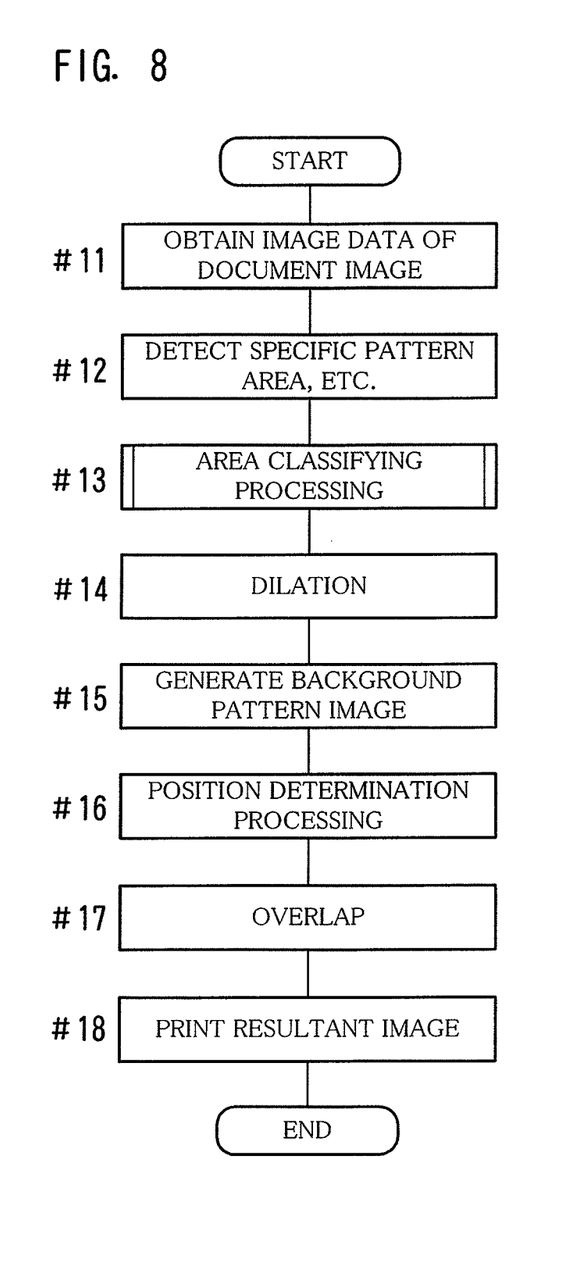
FIG. 8 is a flowchart depicting an example of the overall processing flow of an image forming apparatus.

FIG. 8 is a flowchart depicting an example of the overall processing flow of the image forming apparatus 1. The following is a description of steps of the overall processing for overlaying a background pattern image 51 on a document image 50 and printing the resulting image onto paper, with reference to the flowchart of FIG. 8.

When obtaining image data of the document image 50 (Step #11 of FIG. 8), the image forming apparatus 1 detects, in the document image 50, a specific pattern area 50p, a thin line 50h, and a dot high-density area 50d (Step #12). The image forming apparatus 1 classifies an area that does not correspond to any of the specific pattern area 50p, the dot high-density area 50d, and a thin line area as either one of a free area, a dots-to-be-invisible area, and a non-dot area (Step #13). The classification method is as discussed earlier with reference to FIG. 6.

The image forming apparatus 1, then, performs dilation processing on an area that is classified as the dots-to-be-invisible area or the non-dot area, and makes two areas adjacent to each other contact each other (Step #14).

In parallel with the processes of Step #12 through Step #14 or before or after the same, the image forming apparatus 1 generates a background pattern image 51 (Step #15). The image forming apparatus 1, then, determines where to dispose, in the document image 50, character dots 6J and dots-to-be-invisible 6S constituting the background pattern image 51 (Step #16).

Subsequently, the image forming apparatus 1 places the character dots 6J and the dots-to-be-invisible 6S at the positions on the document image 50 determined as discussed above; thereby to overlay the background pattern image 51 on the document image 50 (Step #17). The image forming apparatus 1, then, prints the resultant image onto paper (Step #18).

Figure 9:
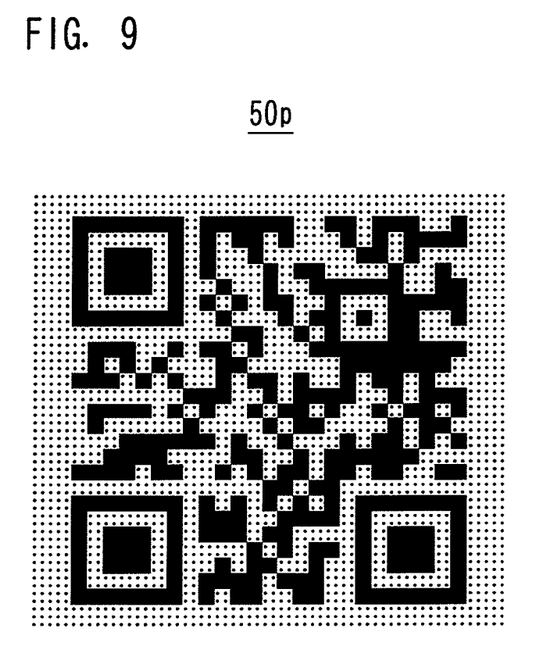
FIG. 9 is a diagram illustrating an example of a specific pattern area of a document image that is the original image depicted on paper.

FIG. 9 is a diagram illustrating an example of a specific pattern area 50p of a document image 50 that is the original image depicted on paper.

In this embodiment, as shown in FIG. 9, dots-to-be-invisible 6S are placed in a QR code contained in the document image 50, and no character dots 6J are placed therein. Accordingly, even when a digital camera or the like equipped in a mobile phone terminal is used to shoot the QR code in the document image 50 on which a background pattern image 51 is overlaid, the QR code can be analyzed properly with the background pattern image 51 not sensed. Further, this embodiment makes it possible to integrate the background pattern image 51 into an area other than the specific pattern area 50p of the document image 50.

As shown in the lower-right of FIG. 4, this embodiment exemplifies a case in which a thin line area is an area between thin lines 50h having the same width. The embodiment is not limited thereto, and a one-dimensional bar code may be regarded as the thin line area. Stated differently, a one-dimensional bar code may be dealt with as a specific pattern area 50p, and also, as a thin line area.

It is a matter of course that, when a printed matter obtained by using the apparatus or method according to the present invention is copied to paper, among dots constituting the background pattern image 51, only character dots 6J are copied onto the paper. In short, a character string such as "COPY" is conspicuously visible in the duplicate. It is, thus, possible to deter a person from making unauthorized copying of the document image 50, namely, the original document.

In the embodiments discussed above, the overall configurations of the image forming apparatus 1, the configurations of various portions thereof, the content to be processed, the processing order, the structure of the document image 50, and the like may be altered as required in accordance with the subject matter of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A background pattern image combining apparatus for combining a background pattern image with an input image, the background pattern image including a plurality of first isolated points having a size that can be read by an image reader and a plurality of second isolated points having a size that cannot be read by the image reader, the background pattern image combining apparatus comprising a processor that is configured to:

detect, in the input image, a specific area which is an area having a specific state; and combine the background pattern image with the input image by placing not the plurality of first isolated points but the plurality of second isolated points in the specific area, and, by placing the plurality of first isolated points and the plurality of second isolated points in an area other than the specific area;

wherein the processor detects, as the specific area, any one of a specific pattern area that is an area having a specific pattern other than a blank area, a high density area where a ratio of a quantity of dotted pixels to a total quantity of pixels in said high density area is a predetermined value or more, and a thin line area that is an area defined by two lines having a width not greater than a predetermined value.

2. The background pattern image combining apparatus according to claim 1, wherein the processor detects, as the specific area, a specific pattern area that is an area having a specific pattern.

3. The background pattern image combining apparatus according to claim 1, wherein the processor detects, as the specific area, a high density area where a ratio of a quantity of dotted pixels to a total quantity of pixels in said high density area is a predetermined value or more.

4. The background pattern image combining apparatus according to claim 1, wherein the processor detects, as the specific area, a thin line area that is an area defined by two lines having a width not greater than a predetermined value.

5. The background pattern image combining apparatus according to claim 4, wherein the processor places the plurality of first isolated points and the plurality of second isolated points in the thin line area and an adjacent area next to the thin line area in such a manner that with respect to one line, out of the two lines, sandwiched between said thin line area and said adjacent area, a first distance between said one line and a first adjacent point is equal to a second distance between said one line and a second adjacent point, the first adjacent point being one of the plurality of first isolated points and the plurality of second isolated points closest to said one line in said thin line area, and the second adjacent point being one of the plurality of first isolated points and the plurality of second isolated points closest to said one line in said adjacent area.

6. The background pattern image combining apparatus according to claim 4, wherein the processor determines whether or not the two lines have a same color as that of the plurality of first isolated points, and, if the processor determines that the two lines have the same color, then the processor detects an area defined by the two lines as the thin line area.

7. The background pattern image combining apparatus according to claim 1, wherein the processor does not place any of the plurality of first isolated points and any of the plurality of second isolated points next to a pixel representing a black dot in the input image.

8. A background pattern image combining method for combining a background pattern image with an input image, the background pattern image including a plurality of first isolated points having a size that can be read by an image reader and a plurality of second isolated points having a size that cannot be read by the image reader, the background pattern image combining method comprising:
   detecting, via a processor, in the input image, a specific area which is an area having a specific state, and the specific area includes any one of a specific pattern area that is an area having a specific pattern other than a blank area, a high density area where a ratio of a quantity of dotted pixels to a total quantity of pixels in said high density area is a predetermined value or more, and a thin line area that is an area defined by two lines having a width not greater than a predetermined value; and
   combining, via the processor, the background pattern image with the input image by placing not the plurality of first isolated points but the plurality of second isolated points in the specific area, and, by placing the plurality of first isolated points and the plurality of second isolated points in an area other than the specific area.

9. The background pattern image combining method according to claim 8, wherein said detecting includes detecting, as the specific area, a specific pattern area that is an area having a specific pattern.

10. The background pattern image combining method according to claim 8, wherein said detecting includes detecting, as the specific area, a high density area where a ratio of a quantity of dotted pixels to a total quantity of pixels in said high density area is a predetermined value or more.

11. The background pattern image combining method according to claim 8, wherein said detecting includes detecting, as the specific area, a thin line area that is an area defined by two lines having a width not greater than a predetermined value.

12. The background pattern image combining method according to claim 11, wherein the plurality of first isolated points and the plurality of second isolated points are placed in the thin line area and an adjacent area next to the thin line area in such a manner that with respect to one line, out of the two lines, sandwiched between said thin line area and said adjacent area, a first distance between said one line and a first adjacent point is equal to a second distance between said one line and a second adjacent point, the first adjacent point being one of the plurality of first isolated points and the plurality of second isolated points closest to said one line in said thin line area, and the second adjacent point being one of the plurality of first isolated points and the plurality of second isolated points closest to said one line in said adjacent area.

13. The background pattern image combining method according to claim 11, wherein it is determined whether or not the two lines have a same color as that of the plurality of first isolated points, and, if it is determined that the two lines have the same color, then an area defined by the two lines is detected as the thin line area.

14. The background pattern image combining method according to claim 8, wherein neither the plurality of first isolated points nor the plurality of second isolated points are placed next to a pixel representing a black dot in the input image.

15. A non-transitory computer-readable storage medium storing thereon a computer program used in a computer for combining a background pattern image with an input image, the background pattern image including a plurality of first isolated points having a size that can be read by an image reader and a plurality of second isolated points having a size that cannot be read by the image reader, the computer program causing the computer to perform:
   a first process for detecting, in the input image, a specific area which is an area having a specific state, and the specific area includes any one of a specific pattern area that is an area having a specific pattern other than a blank area, a high density area where a ratio of a quantity of dotted pixels to a total quantity of pixels in said high density area is a predetermined value or more, and a thin line area that is an area defined by two lines having a width not greater than a predetermined value; and
   a second process for combining the background pattern image with the input image by placing not the plurality of first isolated points but the plurality of second isolated points in the specific area, and, by placing the plurality of first isolated points and the plurality of second isolated points in an area other than the specific area.

16. The non-transitory computer-readable storage medium according to claim 15, wherein the computer program causes the computer to perform, as the first process, a process for detecting, as the specific area, a specific pattern area that is an area having a specific pattern.

17. The non-transitory computer-readable storage medium according to claim 15, wherein the computer program causes the computer to perform, as the first process, a process for detecting, as the specific area, a high density area where a ratio of a quantity of dotted pixels to a total quantity of pixels in said high density area is a predetermined value or more.

18. The non-transitory computer-readable storage medium according to claim 15, wherein the computer program causes the computer to perform, as the first process, a process for detecting, as the specific area, a thin line area that is an area defined by two lines having a width not greater than a predetermined value.

19. The non-transitory computer-readable storage medium according to claim 18, wherein the plurality of first isolated points and the plurality of second isolated points are placed in the thin line area and an adjacent area next to the thin line area in such a manner that with respect to one line, out of the two lines, sandwiched between said thin line area and said adjacent area, a first distance between said one line and a first adjacent point is equal to a second distance between said one line and a second adjacent point, the first adjacent point being one of the plurality of first isolated points and the plurality of second isolated points closest to said one line in said thin line area, and the second adjacent point being one of the plurality of first isolated points and the plurality of second isolated points closest to said one line in said adjacent area.

20. The non-transitory computer-readable storage medium according to claim 18, wherein, in the first process, the computer program causes the computer to determine whether or not the two lines have a same color as that of the plurality of first isolated points, and, if the computer determines that the two lines have the same color, then an area defined by the two lines is detected as the thin line area.

21. The non-transitory computer-readable storage medium according to claim 15, wherein, in the second process, neither the plurality of first isolated points nor the plurality of second isolated points are placed next to a pixel representing a black dot in the input image.

\* \* \* \* \*